United States Patent
Tran (10) Patent No.: US 6,735,449 B2
(45) Date of Patent: May 11, 2004

(54) APPARATUS, AND AN ASSOCIATED METHOD, FOR FACILITATING POWER CONTROL IN A COMMUNICATION SYSTEM

(75) Inventor: Jean-Marie Tran, San Diego, CA (US)

(73) Assignee: Nokia Corporation, Espoo (FI)

(*) Notice: Subject to any disclaimer, the term of this patent is extended or adjusted under 35 U.S.C. 154(b) by 614 days.

(21) Appl. No.: 09/752,546

(22) Filed: Dec. 28, 2000

(65) Prior Publication Data

US 2002/0086694 A1 Jul. 4, 2002

(51) Int. Cl.[7] .................................................. H04B 7/00
(52) U.S. Cl. ..................... 455/522; 455/517; 455/68; 455/69
(58) Field of Search ................. 455/522, 517, 455/68, 69, 507, 500

(56) References Cited

U.S. PATENT DOCUMENTS 5,822,318 A * 10/1998 Tiedemann et al. ......... 370/391
6,389,296 B1 * 5/2002 Shiraki et al. ............... 455/522
6,628,637 B1 * 9/2003 Li et al. ...................... 370/342

FOREIGN PATENT DOCUMENTS

| DE | 198 21 519 A1 | 11/1999 | |
|---|---|---|---|
| WO | WO 97/26716 | 7/1997 | |
| WO | WO 98/09384 | 3/1998 | |
| WO | wo 00/04649 | * 1/2000 | .......... H04B/7/005 |
| WO | wo 00/57572 | * 9/2000 | .......... H04B/7/005 |
| WO | WO 01/76263 A2 | 10/2001 | |

* cited by examiner

Primary Examiner—William Trost
Assistant Examiner—Danh C Le (57) ABSTRACT

Apparatus, and an associated method, by which to facilitate regulation of power levels of a communication signal generated during operation of a communication system. Closed-loop power control is effectuated by selectively generating a power control command such as a power up or power down command responsive to calculated time rates of change of a calculated difference value. By generating a power command responsive to calculations of time rates of change, earlier decisions are made of the power control commands than conventionally permitted in conventional closed-loop power control schemes.

20 Claims, 4 Drawing Sheets

APPARATUS, AND AN ASSOCIATED METHOD, FOR FACILITATING POWER CONTROL IN A COMMUNICATION SYSTEM

The present invention relates generally to a manner by which to effectuate power control of the power level at which a communication signal is communicated in a two-way communication system, such as a cellular communication system in which both a pilot channel signal and a traffic channel signal are transmitted. More particularly, the present invention relates to apparatus, and an associated method, by which to make power control decisions by which to power control the traffic channel signal responsive to calculation of time rates of change of values associated with signal indicia, such as the SIR (Signal to Interference Ratio), of the pilot channel communication signal. Earlier power-control decisions are made, in contrast to conventional closed-loop, power-control techniques, to facilitate operation of an embodiment of the present invention.

BACKGROUND OF THE INVENTION

A communication system is formed, at a minimum, of a sending station and a receiving station which are interconnected theretogether by way of a communication channel. Information to be communicated by the sending station is communicated upon the communication channel to the receiving station. A wide variety of different types of communication systems have been developed and are regularly utilized to effectuate communication of information between the sending and receiving stations.

New types of communication systems have been made possible as a result of communication technologies. A radio communication system is exemplary of a type of communication system which has benefited from advancements in communication technologies. A communication channel formed between the sending and receiving stations of a radio communication system is defined upon a radio link. Because a radio link is utilized to form the communication channel, the conventional need to utilize wire-line connections between the sending and the receiving stations is obviated. Increased communication mobility is, as a result, inherent in a radio communication system in contrast to a conventional wire-line system. Because a wire-line connection is not required to be formed between the sending and receiving stations to permit the communication of information therebetween, communications are permitted at, and between, locations at which the formation of a wire-line connection would not be possible. Also, because a communication channel is formed of a radio channel, a radio communication system can generally be more economically installed, as the infrastructure costs which would otherwise be required to install a wire-line communication system are significantly reduced in a radio communication system.

A cellular communication system is exemplary of a radio communication system which has been made possible due to advancements in communication technologies. A cellular communication system advantageously provides for radio communications with mobile stations to permit telephonic communication therewith. A cellular communication system also makes relatively efficient utilization of the portion of the electromagnetic spectrum allocated thereto and upon which radio channels are defined. The relatively efficient utilization of the allocated electromagnetic spectrum is provided through the installation of a plurality spaced-apart, fixed-site transceivers installed throughout a geographical area to be encompassed by the cellular communication system. Because of the spaced-apart positioning of the fixed-site transceivers, referred to base transceiver stations (BTSs), only relatively low-power signals need to be communicated between a base transceiver station and a mobile station. That is to say, because of the positioning of the base transceiver stations, a mobile station shall be positioned in proximity to at least one of the base transceiver stations, necessitating only low-power signals to be generated to communicate a signal to, or from, a base transceiver station. And, the same communication channel can be reused at different locations throughout the cellular communication system as the low power levels of the signals permit the reuse of the same channel according to a cell re-use scheme.

Various standards have been promulgated relating to various types of cellular, as well as other, communication systems. And, various types of cellular, as well as other, communication systems have been constructed, corresponding to such standards. The IS-95 and IS-98 interim standards, promulgated by the EIA/TIA, are exemplary of standards which pertain to a cellular communication system, utilizing CDMA (code division multiple access) communication techniques. An IS2000 standard has been proposed which also utilizes CDMA communication techniques. In a CDMA communication system, a plurality of concurrently-generated communication signals are generated upon a common bandwidth. Channel differentiation is defined by the coding by which the data which is to be communicated between sending and receiving stations is encoded.

Power control of communication signals in almost any communication system is important to minimize the possibility that a communication signal might interfere with another concurrently-generated communication signal. In a CDMA communication system in which coding provides channel differentiation between concurrently-communicated signals generated upon a common bandwidth, power control is particularly important to ensure that a communication signal is not of such a great power level to prevent the detection of other concurrently-generated signals.

CDMA communication systems, such as the aforementioned IS-95, IS-98, and the proposed IS-2000 standards, set forth, amongst other things, requirements for closed-loop power control to control the power levels at which communication signals generated in such systems are communicated. And more, more generally, because of the need to control power levels of signals generated during operation of a CDMA communication system, closed-loop power control schemes are also advantageously implemented in other types of CDMA communication systems.

Generally, in a closed-loop power control scheme, a receiving station detects signals communicated thereto by a sending station. Measurements are made at the receiving station of indicia associated with the signal detected thereat. Responsive to the measurement of the indicia, a determination is made at the receiving station as to whether subsequently-generated communication signals to be communicated to the receiving station by the sending station should be increased, or decreased, in power. Indications of such determination are returned to the sending station and the power level of subsequently-generated communication signals are altered as appropriate.

In one power control scheme set forth for the IS-2000 system, forward link power control is effectuated by measuring, at the mobile station, signal indicia associated with forward-link traffic channel signals. Namely, measurements are made of frame error rates of the frames of the forward-link traffic channel signals. The frame error rate of the traffic channel signal is associated with the SIR (signal to interference ratio) of the traffic channel signal. Responsive to the measurements, a decision is made either to request an increase or to request a decrease in the power levels of the forward-link traffic channel signals. Estimation of the SIR levels of the forward-link traffic channel signals based upon these measurements, however, are susceptible to bias and variance.

Because any delay in the alteration in the power levels at which a communication signal is communicated might adversely affect communications of other communication signals, it is important effectuate power control quickly. Measurement, and subsequent determination, of communication signal indicia at a receiving stations results in some delay in the effectuation of power control in a closed-loop power control scheme.

Any manner by which to permit earlier determination of whether to alter the power levels of the communication signals to be transmitted to a receiving station would facilitate the early effectuation of power control. Also, any manner by which to effectuate power control based upon measurements which exhibit lowered levels of bias and variance would be advantageous.

It is in light of the background information related to the effectuation of power control in a communication system that the significant improvements of the present invention have evolved.

SUMMARY OF THE INVENTION

The present invention, accordingly, advantageously provides apparatus, and an associated method, by which to effectuate power control of the power levels at which communication signals are communicated in a two-way communication system, such as a cellular communication system.

Through operation of an embodiment of the present invention, a manner is provided by which to make power control decisions responsive to calculation of time rates of change of values associated with signal indicia, such as the signal to interference ratio (SIR) of a communication signal communicated upon a channel which exhibits channel characteristics similar to the channel characteristics of the channel upon which the communication signal which is to be power controlled is communicated.

By calculating the time rates of change of values associated with the signal indicia of the communication signal when received at the receiving station, earlier power controlled decisions are made, thereby to permit early effectuation of power control.

In one aspect of the present of invention, measurements are made by the receiving station of signal to interference ratios of a communication signal transmitted thereto by the sending station. In a communication system which utilizes both pilot signals and traffic signals, for instance, the signal to interference ratio of the pilot signal is first determined at the receiving station. The pilot signal is of a relatively high power level and is of a constant characteristic in the absence of fading. Differences between the measured signal to interference ratio and a target value, such as a target signal to interference ratio, are determined. If the value of the difference, so-determined, is beyond a selected range of different values, a determination is made as to whether to generate a power up command or to generate a power down command. That is to say, when the difference is greater than a selected value, the generation of a power down command is selected and, when the difference is less than another threshold value, selection of generation of a power up command is made.

In another aspect of the present invention, determination of the signal to interference ratio of a communication signal detected at the receiving station is again made. Again, the communication signal upon which the measured value of the signal to interference ratio is determined is formed of a pilot signal sent by the sending station. Differences made between measured signal to interference ratio and a target value, such as a target signal to interference ratio, are determined. If the difference is within a selected range of values, the time-rate of change of the difference is then calculated. If the time rate of change of the difference is a positive value. Selection is made to generate a power down command. And, if the time-rate of change of the difference is a negative value, selection is made to generate a power up command.

As the pilot channel signal, in the absence of fading, exhibits constant characteristics, changes in the signal are indicative of fading on the channel upon which the pilot channel is communicated. And, as the pilot and traffic channels extending between the BTS and the mobile station exhibit similar characteristics, changes in the pilot channel signal are also indicative of fading on the traffic channel. When increased fading is exhibited upon the traffic channel, the power level of the traffic channel signal must be increased to compensate for the increased fading. So, by calculating the time rate of change of the pilot channel signal, an early determination can be made of power level changes to be requested of the traffic channel signal power levels. When the time rate of change is determined to be of a positive value, a power down command is generated as the pilot channel signal, when detected at the mobile station, appears to be increasing in value, the fading is lessening. And, when the time rate of change is determined to be of a negative value, a power up command is generated. As the pilot channel signal, when detected at the mobile station, appears to be decreasing in value, the fading is worsening.

In one implementation, an embodiment of the present invention is utilized to effectuate power control in a cellular communication system, such as a cellular communication system proposed pursuant to the IS-2000 standard which utilizes CDMA communication techniques. A base transceiver station generates and transmits a pilot signal which is detected by a mobile station. The signal to interference ratio of the pilot signal is calculated. Measurements are made of the pilot signal as the pilot signal is generally of a relatively high power level and is of constant characteristics. Therefore, typically, the pilot signal level is a reliable measure of channel impairments, such as the fading to be expected upon the traffic channel. Difference calculations are performed upon the measured signal to interference ratio and a target value. If the difference value is less than a lower threshold, selection is made to generate a power up command, if the difference is greater than an upper threshold, a selection is made to generate a power down command. And, if the differences between the lower and upper thresholds are between the lower and upper thresholds, a time rate of change of the difference is calculated. If the time rate of change is a positive value, selection is made to generate a power down command. And if the time rate of change of the difference is a negative value, selection is made to generate a power up command.

In these and other aspects, therefore, apparatus, and an associated method, is provided for a communication system in which communication signals are communicated between a first communication station and a second communication station. Regulation of power levels of a forward-link of power-controlled communication signal communicated by the first communication station to the second communication station is facilitated. A difference calculator is coupled to receive an indication of a signal indicia associated with a non power-controlled forward link communication signal. The signal indicia is representative of content detectability of the non power-controlled communication signal. The difference calculator calculates the difference between a value of the signal indicia and a selected value. A change rate calculator is coupled to the difference calculator. The change rate calculator calculates a time rate of change of differences calculated by the difference calculator when the difference is within a selected range. A power command generator is at least selectively operable responsive to the time rate of change calculated by the change rate calculator. The power command generator generates a command to command the first communication station, to alter the power levels of the forward link power-controlled communication signal.

A more complete appreciation of the present invention and to the scope thereof can be obtained from the accompanying drawings which are briefly summarized below, the following detailed description of the presently preferred embodiments of the invention, and the appended claims.

DETAILED DESCRIPTION

Figure 1:
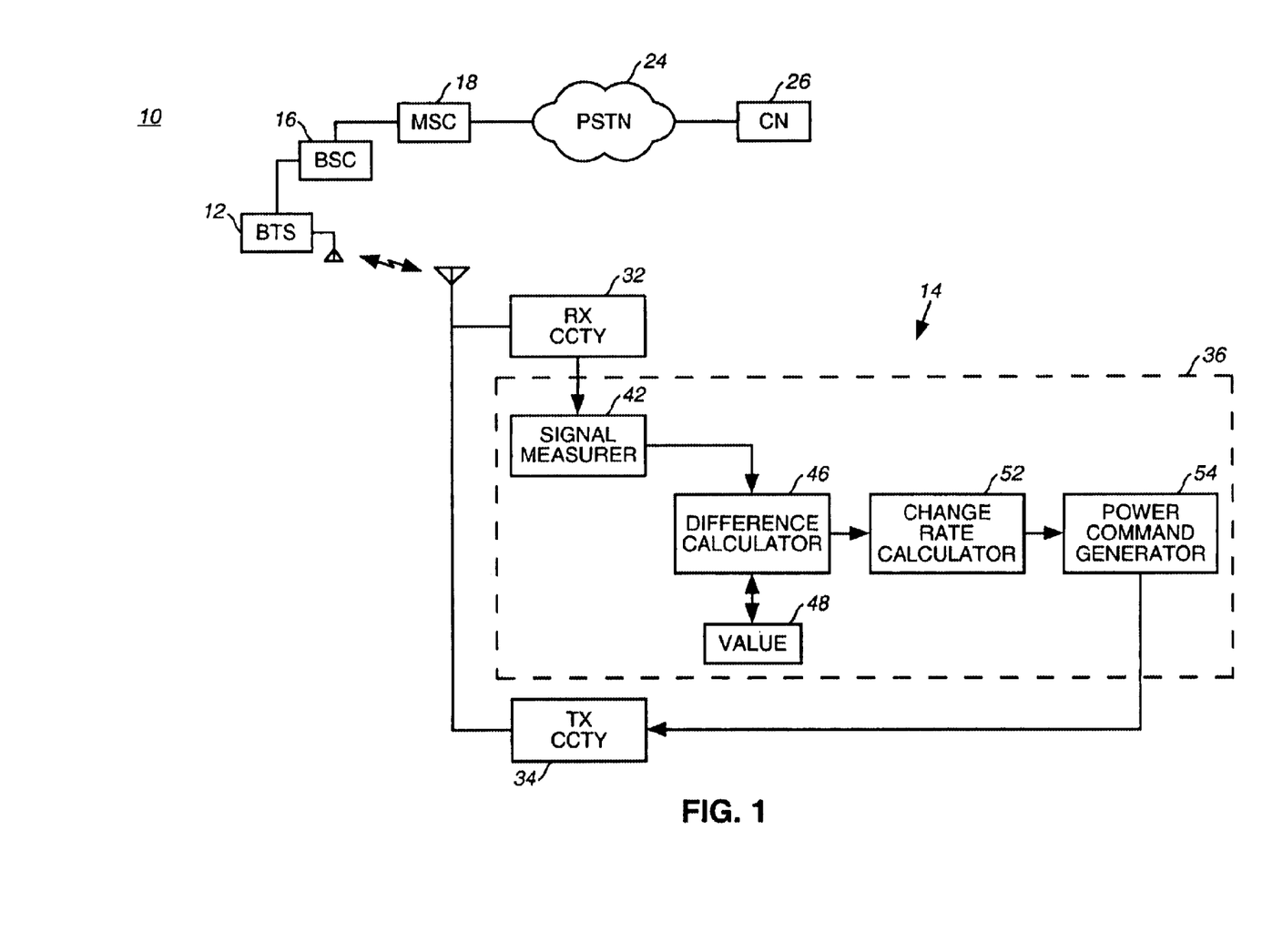
FIG. 1 illustrates a function block diagram of an exemplary communication system in which an embodiment of the present invention is operable.

Referring first to FIG. 1, a communication system shown generally a 10, provides for radio communications between two communication stations, here a base transceiver station (BTS) 12 and a mobile station 14 by way of radio links formed therebetween. In the exemplary implementation shown in the figure, the communication system 10 forms a cellular communication system operable generally pursuant to the specification proposed for the IS-2000 cellular communication system which utilizes CDMA communication techniques. It should be understood at the outset, of course, that operation of an embodiment of the present invention is similarly also possible in other types of radio, and other, communication systems. Therefore, while the following description shall describe operation of an embodiment of the present invention with respect to the IS-2000 system, operation of an embodiment of the present invention can analogously be described with respect to any of various other types of communication systems to effectuate power control therein.

In operation of the communication system, two-way communications are permitted between the mobile station 14 and the base transceiver station 12. Forward link signals, generated by the base transceiver station 12, are communicated to the mobile station 14 by way of a forward link formed therebetween and, reverse link communication signals generated at the mobile station 14 are communicated to the base transceiver station 12, by way of a reverse link therebetween. Both traffic channel signals and pilot channel signals are communicated upon a forward link to the mobile station. The traffic channel signals are power-controlled, while the pilot channel signals are non power-controlled. The pilot channel signals are of substantially constant characteristics in the absence of fading on the forward link.

The base transceiver station 12, is coupled to a base station controller (BSC) 16. And, the base station is, in turn, coupled to a mobile switching center (MSC) 18. The MSC is coupled to a network backbone, here a PSTN (public switched telephonic network) 24, and a correspondent node (CN) 26 is coupled to the PSTN. A communication path is formable between the correspondent node 26 and the mobile station 14 by way of the PSTN 24, the MSC 18, the BSC 16, the BTS 12, and a radio link formed between the base transceiver station and the mobile station. Thereby, communications, of both voice data and non-voice data, are effectuable between the correspondence node and the mobile station. In the exemplary implementation shown in the figure, the base transceiver station defines a cell, and numerous space transceiver stations are positioned at spaced-apart locations throughout a geographical area to define a plurality of cells within any of which the mobile station 14 is capable of radio communications with an associated base transceiver station to communicate therewith.

Traffic channel signals communicated upon the radio link formed between the base transceiver station and the mobile station must be of appropriate power levels to ensure that the transmitted signals are of signal levels permitting their detection when received and also to ensure that the signal level does not interfere with other concurrently-transmitted communicated signals. That is to say, traffic channel signals transmitted upon the radio link must be of power levels great enough to permit their detection and ascertainment of their informational content but also not to be of levels so great as to interfere with other communications signals communicated currently therewith. Fading exhibited upon the channel is, at least in part, determinative of the power levels at which the traffic channel signals are, when received at the mobile station. When fading is significant, the power levels of the traffic channel signals must be increased to counteract fading. And, when fading is less significant, the power levels are reduced.

Operation of an embodiment of the present invention provides a manner by which to effectuate closed-loop power control in which decisions selecting generation of a power up, or power down, command are made upon analysis of a pilot channel signal communicated upon a forward link to the mobile station. The mobile station 14 is here shown to receive circuitry 32 and transmit circuitry 34. The receive circuitry operates upon forward link signals, both traffic and pilot channel signals, communicated by way of a forward link to the mobile station. And the transmit circuitry 34 is operable to generate reverse link signals to be communicated upon a reverse link back to the base transceiver station 12. The mobile station further includes control circuitry 36 operable, inter alia, pursuant to an embodiment of the present invention to select and to cause generation of power control commands which are utilized in the effectuation of power control to control the power levels of traffic channel communication signals generated by the base transceiver station on the forward link. The control circuitry includes functional elements operable to perform functions pursuant to an embodiment of the present invention to effectuate the generation of the power control commands. In the exemplary implementation, the control circuitry forms the processor circuitry capable of executing algorithms, and the functional elements shown to form portions of the control circuitry are algorithms executable by the processor circuitry. In other implementations, the control circuitry is implemented in other manners and the functional elements are functionally operable, as appropriate, in such other implementations.

The control circuitry 36 includes a signal measurer 42 coupled to the receive circuitry 32. The signal measurer is selectively operable to measure signal to interference ratios (SIRs) of pilot channel signals detected by the receive circuitry 32. Namely, during operation of the mobile station, the mobile station is tuned to a pilot channel upon which a pilot signal generated by the base transceiver station is communicated. Measurement of the pilot signal is made as the pilot signal is not power-controlled and is of a relatively large strength level. Changes in the value of the pilot channel are indicative of changes in levels of fading of the channel.

The measured SIR value is provided to a difference calculator 46. The difference calculator is operable to calculate the mathematical difference between the measured value measured by the measurer 42 and a stored value, here represented by the value 48.

In one implementation, the power level of the pilot signal is computed for a time period corresponding to an equivalent traffic symbol length and then averaged over a series, N, of symbols. The value of N varies between one and the number of symbols corresponding to a full power control group which is transmitted during a 1.2 ms time period according to the IS-2000 specification proposal. For instance, for a sixty-four chip symbol N can be of a value of up to twenty-four and for instance, for a 128 chip symbol, N can be of a value of up to twelve. Pilot symbols are readable at a rake receiver portion of the receive circuitry 32 in which each finger of the rake receiver portion outputs pilot symbols for coherent demodulation prior to symbol combining. Pilot power is calculated once during the power control group at a rate of 800 Hz.

Differences formed by the difference calculator are provided to a change rate calculator 52 and to a power command generator 54. If the difference calculated by the difference calculator 46 is within a selected range bounded by a lower threshold and an upper threshold, the change rate calculator is operable to calculate the rate of change of the calculated difference. The change rate calculator is operable, for instance, to calculate the time rate of change by measuring changes of values of the difference over successive quantization periods. Responsive to the calculated time rate of change of the difference, the power command generator 54 is selectably operable to generate a power up or a power down command. In the exemplary implementation, the power command generator is operable responsive to calculations made by the change rate calculator 52 when the difference calculated by the difference calculator is within the range bounded by the lower threshold and the upper threshold.

When the difference calculated by the difference calculator is beyond the range of defined by the lower and upper thresholds, the power command generator 54 is operable to generate the power control commands directly responsive to values calculated by the difference calculator. When the difference calculated by the difference calculator is greater than the upper threshold, the power command generator generates a power down command. When the difference calculated by the difference calculator is less than the lower threshold, the power command generator generates a power up command.

When the difference calculated by the difference the calculator is within the selected range, the rate of change calculated by the change rate calculator is determinative of the commands generated by the power command generator. If the rate of change is greater than zero, a power down command is generated. And, when the range rate is determined to be of a negative value, the power command generator generates a power up command.

The power command generator 54 is coupled to the transmit circuitry 34. The commands generated by the generator 54 are provided thereby to the transmit circuitry, and the transmit circuitry is operable to generate a signal for communication on a reverse link, back to the base transceiver station. The value is used at the base transceiver station to determine the power level at which a traffic channel signal is communicated upon the traffic channel to the mobile station.

Through appropriate generation of the power up and the power down commands, a signal of appropriate of power levels is generated. Because the time rate of change of the difference calculated by the difference calculator is utilized in the selection of the power command which is generated, an earlier generation of the appropriate power command is possible.

Figure 2:
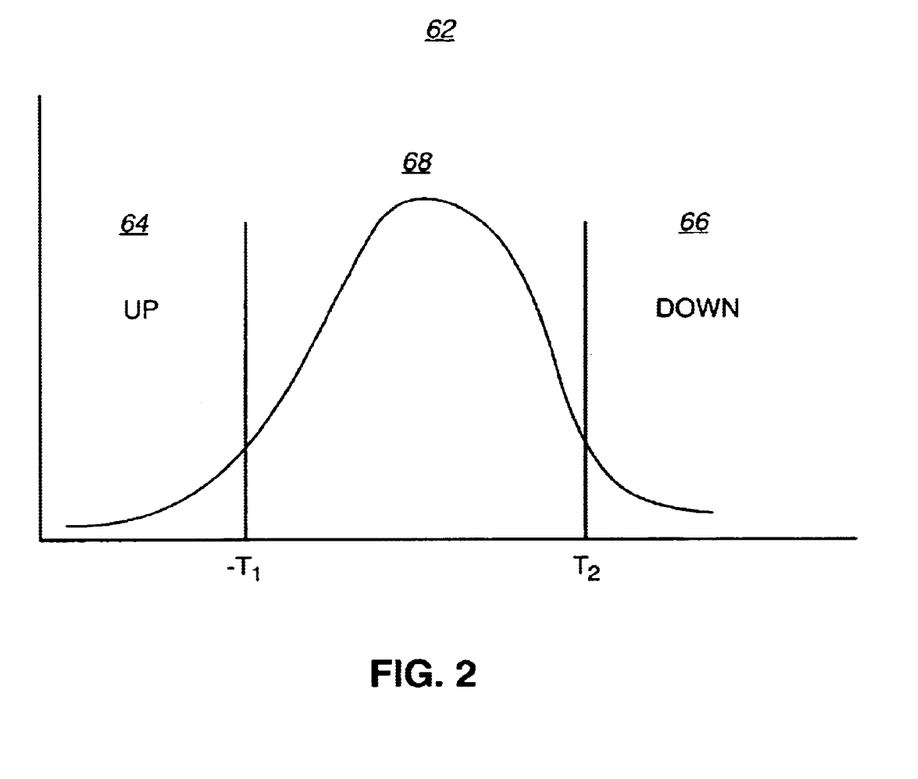
FIG. 2 illustrates graphically the different values of possible differences generated during operation of an embodiment of the present invention and the region of the differences defined by an embodiment of the present invention.

FIG. 2 illustrates a plot, shown generally at 62, of the difference calculated by the difference calculator 46 which forms a portion of the control circuitry 36 (shown in FIG. 1). The possible values of the difference are divided into three regions, an up region 64, a down region 66, and an intermediate region 68. The up region 64 is defined by values of the difference which are less than a lower threshold $-T_1$. And, the down region 66 is defined by an upper threshold $T_2$. The intermediate region 68 is defined by difference values which are within the range of minus $T_1$ and $T_2$. When the difference value of a value within the up or down region 64 or 66, the power command generator 54 (shown in FIG. 1) is operable responsive to calculated times rates of change of the difference value. When the time rate of change is of a positive value, the power command generator generates a power down command. And, when the calculated time rate of change is of a negative value, the power command generator is caused to generate a power up command.

Operation of an embodiment of the present invention can be interpreted as a manner by which a predictive component is used to earlier select generation of a power up or power down command. That is to say, as the value of the pilot signal increases, while the measurement of the SIR is close to a selected value, here the target value, it is likely that the base transceiver should generate signals of lower power levels imminently. Operation of an embodiment of the present invention provides a manner by which to make the decision to generate the power down command earlier than conventionally permitted and to make decisions which are more like to be accurate. Thereby, reduced levels of delay, and improved accuracy, in the closed loop power control scheme result.

Figure 3:
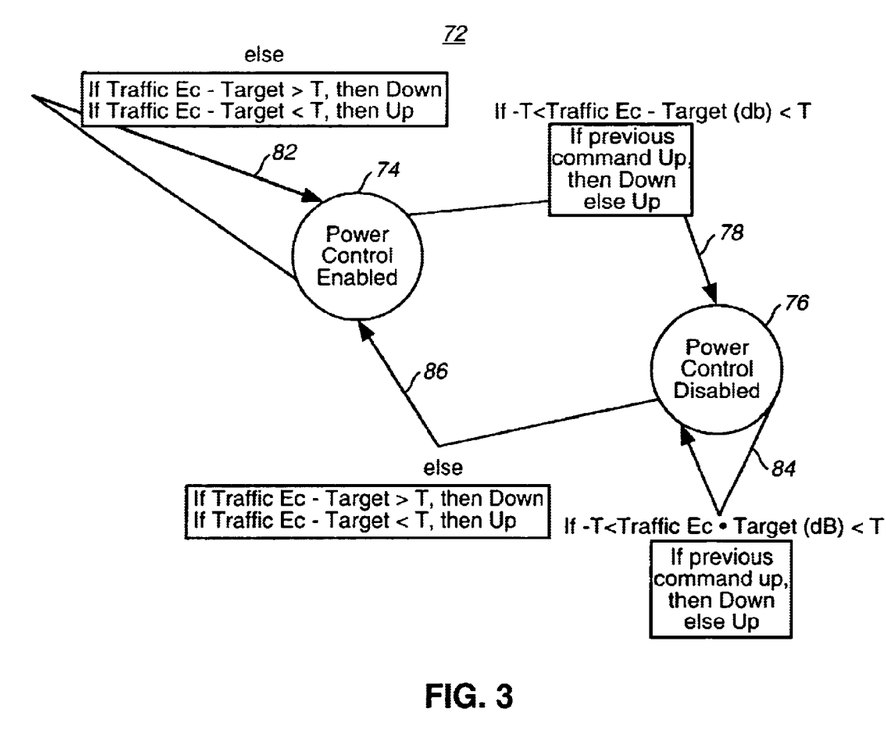
FIG. 3 illustrates a finite state machine diagram representative of operation of an embodiment of the present invention.

FIG. 3 illustrates a state diagram, shown generally at 72, representive of operation of another embodiment of the present invention. Here, two states are defined, a state 74 at which power control is enabled and a state 76 at which power control is disabled. Generally, in this embodiment, when the difference between the SIR of the traffic channel signal and a target value is between a selected range, here of −T and T, power control is disable by alternating between power up and power down commands. When at state 74, if the difference calculated by a difference calculator is within the selected range a path 78 is taken to the power controlled disabled state. Otherwise, the loop 82 is taken back to the power control enabled branch.

If, when at the state 76, the difference value is within the selected range, a path 84 is taken back to the state 76. Otherwise, a path 86 is taken to the state 74. As indicated at the paths 78 and 84, when power control is to be disabled, power control commands are generated alternately to be power up and power down commands, thereby to disable power control. Conversely, and as indicated at the paths 82 and 86, power control is enabled, and power up commands are generated when the difference between the traffic signal SIR and the target is less than a lower threshold, $-T$. And, power down commands are generated when the difference is greater than an upper threshold, T.

Figure 4:
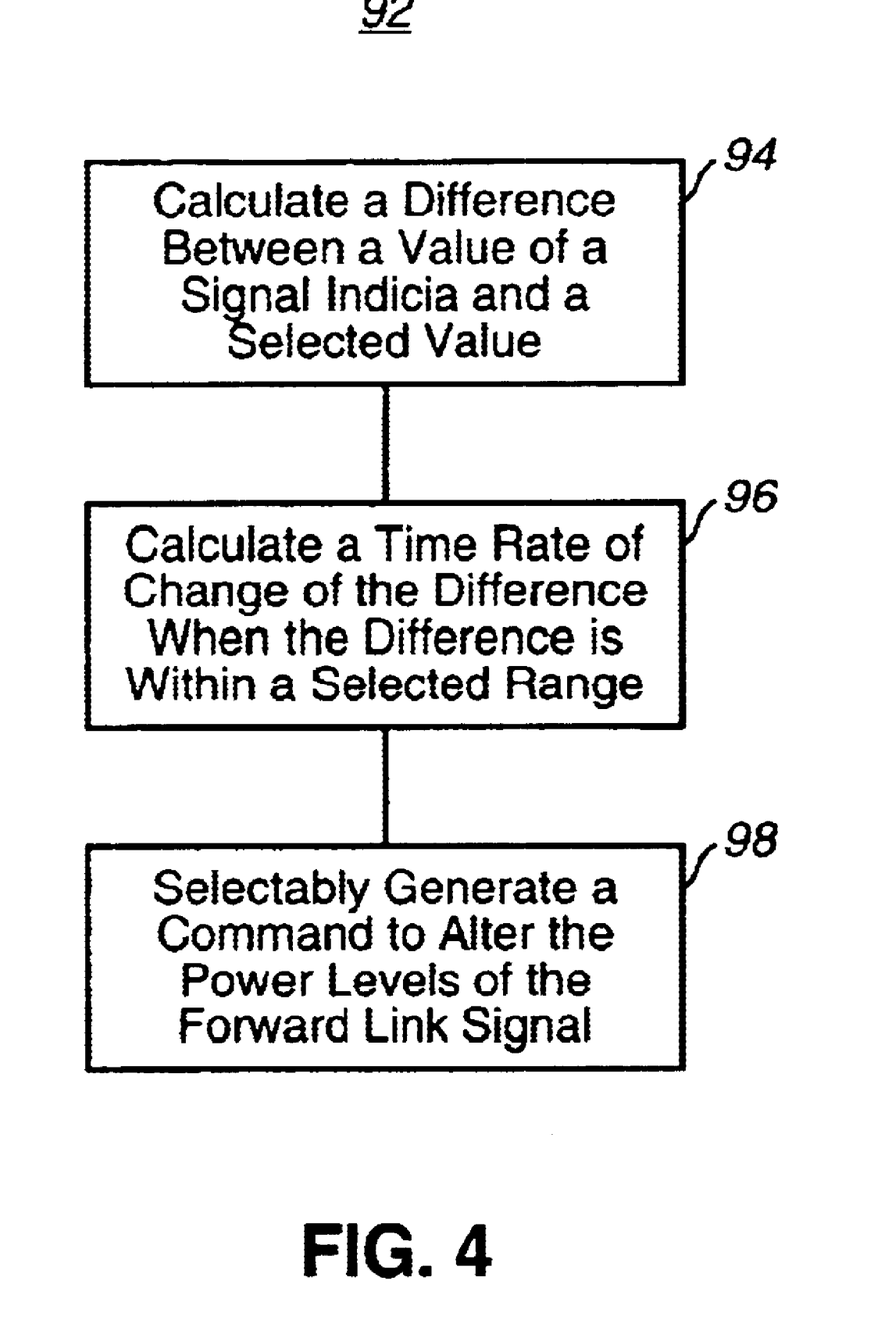
FIG. 4 illustrates a method flow diagram listing the method of operation of an embodiment of the present invention.

FIG. 4 illustrates a method, shown generally at 92, of the method of operation of an embodiment of the present invention. The method 92 is operable to facilitate regulation of power levels of a forward link power-controlled communication signal communicated by a first communication station to a second communication station.

First, and as indicated by the block 94, a difference between a value of a signal indicia and a selected value is calculated. The signal indicia is associated with the forward link non power-controlled communication signal and is representative of content detectablity of the communication signal. Then, and as indicated by the block 96, a time rate of change of the difference is calculated with is within at least within a selected range.

Then, and as indicated by the block 98, a command is selectably generated to command the first communication station to alter the power levels of the forward link power-controlled communication signal at least responsive to the time rate of change.

Thereby, a manner is provided by which to effectuate power control of the power level at which the communication signals generated by the first communication station are communicated to the second communication station.

The previous descriptions are of preferred examples for implementing the invention, and the scope of the invention should not necessarily be limited by this description. The scope of the present invention is defined by the following claims.

What is claimed is:

1. In a communication system in which communication signals are communicated between a first communication station and a second communication station, an improvement of apparatus for facilitating regulation of power levels of a forward-link power-controlled communication signal communicated by the first communication station to the second communication station, said apparatus comprising:

a difference calculator coupled to receive an indication of a signal indicia associated with a non power-controlled forward-link communication signal, the signal indicia representative of content-detectability of the non power-controlled communication signal, said difference calculator for calculating a difference between a value of the signal indicia and a selected value;

a change-rate calculator coupled to said difference calculator, said change-rate calculator for calculating a time-rate of change of the difference calculated by said difference calculator when the difference is within at least a selected range; and a power command generator at least selectably operable responsive to the time-rate of change calculated by said change-rate calculator, said power command generator for generating a command to command the first communication station to alter the power levels of the forward-link power-controlled communication signal.

2. The apparatus of claim 1 further comprising a signal indicia measurer coupled to receive indications of the forward-link non power-controlled communication signal communicated by the first communication station to the second communication station, said signal indicia measurer for measuring the signal indicia associated with the forward-link non power-controlled communication signal.

3. The apparatus of claim 2 wherein said signal indicia measurer comprises a signal strength detector and an SIR (signal interference ratio) calculator coupled thereto, said signal strength detector for detecting signal strength levels of the forward-link non power-controlled signal and said SIR calculator for forming a measured SIR value, the measured SIR value forming the value of the signal indicia.

4. The apparatus of claim 1 wherein the signal indicia, the indication of which said difference calculator is coupled to receive, comprises a measured SIR (signal to interference ratio) value.

5. The apparatus of claim 1 wherein the forward-link non power-controlled communication signal comprises of pilot signal and wherein the measured SIR value comprises a value of the SIR of the pilot signal.

6. The apparatus of claim 5 wherein the selected value by said difference calculator comprises a target SIR value.

7. The apparatus of claim 6 wherein the selected range of values of the difference calculated by said difference calculator and within which said change-rate calculator calculates the time-rate of change is bounded by a lower value and an upper value.

8. The apparatus of claim 7 wherein the time-rate of change calculated by said change-rate calculator indicates at least whether the time-rate of change is a positive value or is a negative value.

9. The apparatus of claim 1 wherein said power command generation is further selectably operable responsive to the difference calculated by said difference calculator for generating the command to command the first communication station to alter the power levels of the forward-link power-controlled communication signal.

10. The apparatus of claim 9 wherein said power command generator is operable responsive to the difference calculated by said difference calculator when the difference is beyond the selected range.

11. The apparatus in claim 10 wherein the selected range is bounded by a lower value and by an upper value and wherein said power command generator generates a power down command when the difference calculated by said difference calculator is greater than the upper value.

12. The apparatus of claim 10 wherein the selected range is bounded by a lower value and by an upper value and wherein said power command generator generates a power-up command when the difference calculated by said difference calculator is less than the lower value.

13. The apparatus in claim 1 wherein said power command generator generates a power-down command when the difference calculated by said difference calculator is within the selected range and the time-rate of change calculated by said change-rate calculator is of a value greater than zero.

14. The apparatus of claim 1 wherein said power command generator generates a power-up command when then difference calculated by said difference calculator is within the selected range and the time-rate of change calculated by said change-rate calculator is of a value less than zero.

15. The apparatus of claim 1 wherein the communication system comprises a cellular communication system, wherein the first communication station comprises a base transceiver station and the second communication station comprises a mobile station, and wherein said difference calculator, said change rate calculator, and said power command generation are located at the mobile station.

16. In a method for communicating in a communication system in which communication signals are communicated between a first communication station and a second communication station, an improvement of a method for facilitating regulation of power levels of a forward-link power-controlled communication signal communicated by the first communication station to the second communication station, said method comprising:

calculating a difference between a value of a signal indicia and a selected value, the signal indicia associated with the forward link non power-controlled communication signal and representative of content-detectability of the non power-controlled communication signal;

calculating a time-rate of change of the difference calculated during said operation of calculating the difference when the difference is within at least a selected range; and selectably generating a command to command the first communication station to alter the power-levels of the forward-link power-controlled communication signal at least responsive to the time-rate of change calculated during said operation of calculating the time-rate of change.

17. The method of claim 16 further comprising the operation, prior to said operation of calculating the difference, of measuring the signal indicia associated with the forward link non power-controlled signal.

18. The method of claim 16 wherein the selected range is bounded by a lower value and by an upper value and wherein said operation of selectably generating comprises generating a power-down command when the difference calculated during said operation of calculating the difference is within the selected range and the time-rate of change calculated during said operation of calculating the time-rate of change is of a value greater than zero.

19. The method of claim 16 wherein the selected range is bounded by a lower value and by an upper value and wherein said operation of selectably generating comprises generating a power-up command when the difference calculated during said operation of calculating the difference in within the selected range and the time-rate of change calculated during said operation of calculating the time-rate of change is of a value less than zero.

20. The method of claim 16 wherein said operation of selectably generating further comprises selectably generating the power control signal responsive to the difference calculated during said operation of calculating the difference.

* * * * *